July 3, 1956

G. JENDRASSIK 2,753,108

PRESSURE EXCHANGERS

Filed Aug. 28, 1950

Inventor
George Jendrassik
By Stevens, Davis, Miller + Mosher
his Attorneys

July 3, 1956 G. JENDRASSIK 2,753,108
PRESSURE EXCHANGERS

Filed Aug. 28, 1950 2 Sheets-Sheet 2

Inventor.
George Jendrassik
By Stevens, Davis, Miller & Mosher
his Attorneys

United States Patent Office 2,753,108
Patented July 3, 1956

2,753,108

PRESSURE EXCHANGERS

George Jendrassik, London, England; Andre Gabor Tihamer Boszormenyi and Clara Jendrassik executors of said George Jendrassik, deceased Application August 28, 1950, Serial No. 181,845

Claims priority, application Great Britain September 9, 1949

4 Claims. (Cl. 230—69)

This invention relates to pressure exchangers of the kind comprising a ring of cells between which and other structure there is relative rotation when the machine is operating, and the working cycle of which involves the compression of gas in some cells of the series and the simultaneous expansion of gas in other cells of the series, the compression and expansion stages thus formed being associated with heat input and heat rejection stages (at high or low pressure) involving the flow of gas into, and/or out of, the cells.

In such machines there exists the double problem of maintaining small clearance between relatively rotating parts at points where gas leakage could occur while at the same time allowing for thermal expansion caused by the hot gases. The efficiency of a pressure exchanger may be critically dependent upon the avoidance of undue gas leakage, and to this end the clearance between relatively rotating parts may need to be very small, possibly of the order of $15/1000$ inch, and to be maintained nearly constant at all times during operation.

The present invention aims at providing means for satisfying the requirements of the above problem.

According to the present invention a pressure exchanger machine comprises two structures (of which at least one is a cell-containing structure) between which there is relative rotation when the machine is in operation and having adjoining faces between which a critical axial distance requires to be maintained to reduce gas leakage wherein the said structures of which one is fixed against axial movement and the other is capable of axial movement, are axially located in mutual relation, in a manner permitting the relative rotation, by bearing means situated in a relatively cool region and of which an outer element is connected to the nearer structure, and an inner element is connected to the more remote structure by means passing through a central opening in the nearer structure, the arrangement being such that axial thermal growth of the axially fixed structure, which would otherwise alter the said critical distance, effects such axial shifting of the other structure as is necessary to preserve said distance, and axial thermal growth of the other structure is constrained to take effect only on the side remote, in the axial sense, from the said adjoining faces, whereby the critical distance between the latter remains in substance unaffected.

Thus, one of the said structures may be a rotor and the other a stator, either of which may contain a ring of cells. More particularly however the invention is applicable to cases where two co-axial contra-rotating rotors (each having a ring of cells) are used arranged in tandem. The rotors may either be separated only by a critical clearance, which requires to be maintained in spite of thermal expansion, or alternatively the rotors may be separated by non-rotary structure and a critical clearance may have to be maintained between the inner end of each rotor and the non-rotary structure.

Within its broad scope therefore the invention may provide a pressure exchanger machine of the kind referred to, comprising two co-axial rotors arranged in tandem (each comprising a ring of cells), which rotors require to be held at a critical axial clearance from each other or from structure interposed between them, wherein each rotor is supported at its axially outer end by bearing means in such manner that one rotor is capable of axial movement while the other is axially fixed and the rotors are located in the required axial positions relative to each other, and their suspension completed, by a third bearing means, situated in a relatively cool region axially external of the rotors, of which bearing means an outer rotary element is connected to the nearer rotor, and an inner rotary element is connected to the more distant rotor by means passing through a central opening in the nearer rotor, the construction and arrangement of the whole being such that axial thermal growth of the axially fixed rotor, which would otherwise alter the said critical clearance, effects such axial shifting of the other rotor as is necessary to preserve the critical clearance, and axial thermal growth of the other rotor is constrained to take effect only on the side remote, in the axial sense, from the clearance, whereby the latter remains in substance unaffected.

It is important that the said inner and outer bearing elements be connected to the rotor or stator structures respectively associated with them by means of members (such as concentrically nested members) so constructed and arranged that in the operating conditions they each undergo substantially the same thermal growth in the axial direction. In order to secure the desired effect these members may be of similar mass, and arranged close to each other so that they are exposed to similar temperature conditions. The members may if necessary be formed in special ways so as to increase the heat transmission from one to the other. For example, they may be apertured, or provided with fins or the like.

By way of example one specific embodiment according to the invention will now be described with reference to the accompanying drawings in which.

Figure 1:
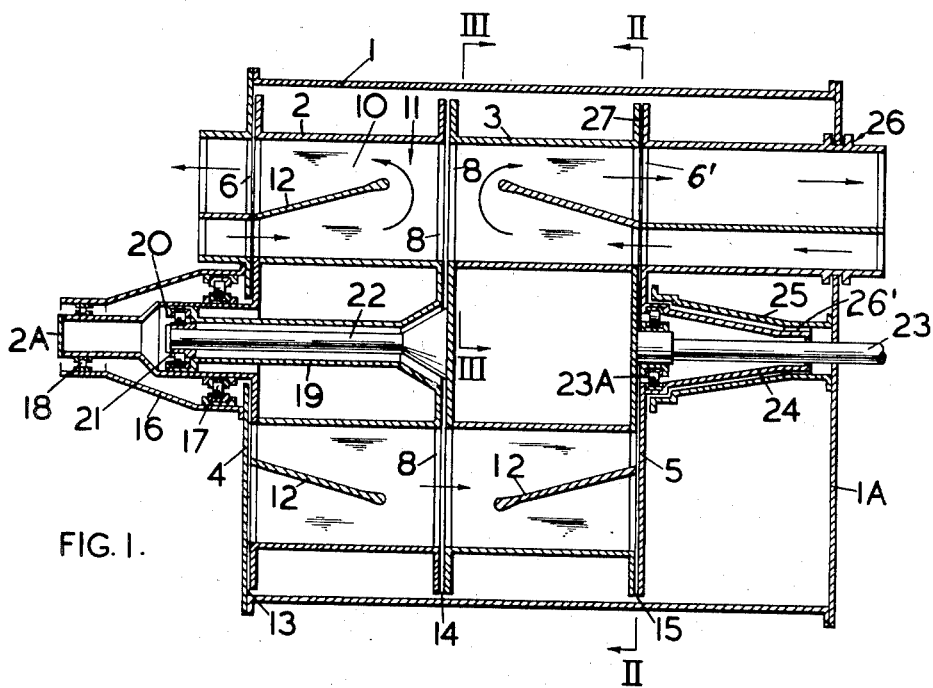
Figure 1 is an axial section of a two rotor pressure exchanger, taken on two planes at right angles, as shown by the line I—I in Figure 2.

The pressure exchanger shown in the drawings is of a kind embodying two co-axial contra-rotating cell rotors. The construction and operation of such machines has been previously described and consequently the description given below will in substance be limited to the features and the effect of the present invention. The pressure exchanger illustrated comprises a cylindrical outer casing 1 within which are mounted for contra-rotation two rotors 2 and 3, which are located between non-rotary end plates 4, 5. The latter are provided with sector shaped openings 6, 7 for scavenging purposes, which openings are connected by ducting as shown.

Each rotor is constructed of inner and outer cylinders the space between which is divided by radial partitions 10 into cells 11. Reverse flow scavenging is employed and the cells are therefore divided into a radially inner and a radially outer section by means of a frusto-conical partition element 12. The course of the scavenging gas current is indicated by the arrows in the upper part of Figure 1. Cells 11 are open at their outer ends but at their inner ends they are partially closed to leave openings 8 for the flow of transfer gas from expansion cells to compression cells as indicated by the arrow in the lower part of Figure 1.

The many pressure exchangers which have been proposed in the past and those which have been built have all comprised a cell ring rotatable relatively to ducting through which gas flows to and from the cells. At one rotational position of a cell a fresh gaseous charge is taken into it and thereafter it is compressed by gas impulse or wave action within the cell or by transfer of gas pressure from another cell or by a combination of the two methods. After the gas has been thus compressed the cell becomes open to further ducting and, if the machine is working as a heat engine, it is arranged to leave this position with a higher pressure and higher temperature charge. Upon further relative rotation taking place expansion of that charge is effected, again either by gas impulses or waves passing through the cell or by transfer of gas pressure to another cell or by both methods. The cell then releases its charge into ducting taking the gas away from the cell ring and a fresh charge is introduced. This process is repeated with each revolution.

Figure 2:
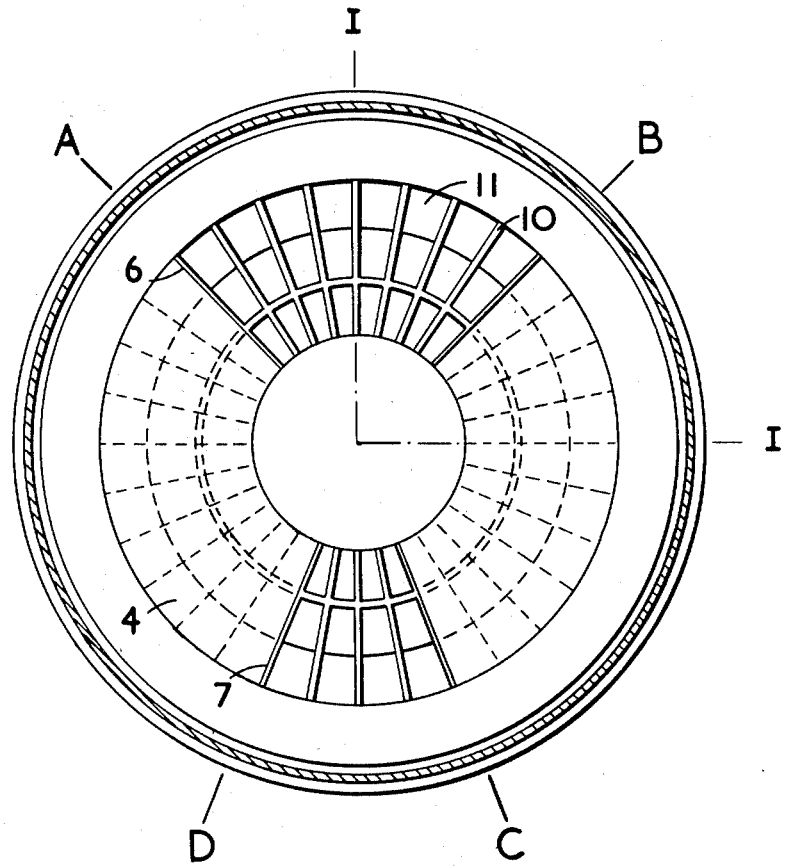
Figure 2 is a transverse section on the line II—II of Figure 1.
Figure 3:
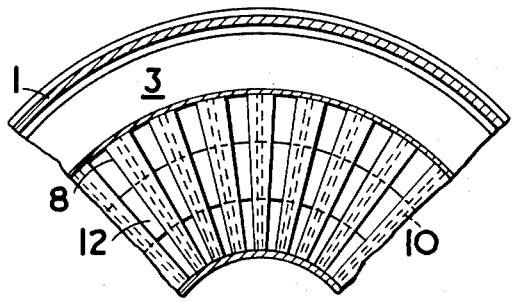
Figure 3 is a fragmentary section on the line III—III of Figure 1.

The embodiment of the present invention shown in the drawing is a pressure exchanger in which the compression and expansion of gas within the cells is effected by transfer of gas pressure between cells. The operation of the pressure exchanger can be briefly described as follows. It will be assumed that the sector-shaped openings 6 and 6' in the end plates 4 and 5 communicate with the low pressure scavenging ducting and the sector-shaped port 7 which is diametrically opposite the port 6 is connected with the high pressure heat input ducting. Considering Figure 2 it will be seen that as a cell of rotor 2, passing in the rotational sense A—B—C—D, is first in communication via the port 6 with the low pressure ducting through which it receives a fresh charge of air; it then proceeds between B and C during which time it is not in connection with any external ducting before coming at C into communication with the high pressure scavenging ducting through the port 7. During passage through the arc BC the cell in the rotor 2 communicates through its open end 8 with cells of the rotor 3 which are passing in the opposite rotational direction and there is an exchange of pressure between them as will be further explained below. This exchange of pressures requires a transfer gas flow as indicated in Figure 1 in the lower half of the figure (which it will be remembered shows a section I—I in the region BC of Figure 2).

When the cells come into communication with the scavenging ports such as 6, the open outer faces of the cells are fully exposed for flow of gas through the cell and scavenging can take place. In the example shown the rotors are scavenged in parallel, that is gas flows into both rotors and out of both rotors; fresh air to be compressed entering the radially inner compartment of the cell 11 of rotor 2, for example, is passed around the end of the partition 12 and, having thus turned through 180°, it flows back out of the radially outer part of the sector-shaped opening 6. In the other cell rotor 3 an identical flow is taking place through the sector-shaped opening 6'. Cells of both rotors therefore are scavenged through by fresh air following a reverse flow through them and they leave this sector AB rotating in opposite directions but filled both with fresh air. The high pressure scavenging in the sector CD takes place in similar manner hot compressed gas, for example from a combustion chamber, entering the cells. In the sectors BC and DA the adjoining openings 8 of the cells of the two rotors are passing one another travelling in opposite directions. A cell of rotor 2 entering the sector BC enters it with fresh air as its charge but a cell of rotor 3 entering the sector BC does so in the opposite direction, that is it travels in the direction CB, and it enters the sector filled with hot compressed gas. Transfer gas flow occurs between the cells of the two rotors. The cells of rotor 2 are individually at pressures increasing from B to C and the cells of rotor 3 are at pressures individually decreasing from C to B. In the sector DA the opposite condition arises. The advantage of the two-rotor pressure exchanger is that transfer gas flow can take place directly between the cells of the two rotors and there is no requirement for transfer gas channels as there is with a single-rotor pressure exchanger operating according to the same system.

Care has to be taken to prevent or at least to control leakage losses and for that reason the end faces of the rotors are outwardly extended in the radial direction as at 27 to provide for the accommodation of sealing means such as labyrinths or sealing blocks. The machine is also enclosed in an outer housing 1 in which it is advisable to maintain a gas pressure intermediate between the high and low pressures obtaining in the cells.

In order to prevent loss of efficiency by undue leakage of gas from the cells it is necessary for very small working clearances possibly as small as $15/1000$ inch to be maintained on the one hand between each rotor and the stationary end plate as indicated at 13, 15, and on the other hand between the rotors as indicated at 14. In order to secure this end the following means is adopted. The end plate 4 together with a tubular structure 16 secured to it and the associated scavenging duct form part of the casing 1 and are axially fixed. The tubular structure 16 contains bearings 17, 18 which are conventionally illustrated in the drawings. The rotor 2 is borne for rotation in these bearings by means of a tubular shaft $2a$ attached to the rotor. The bearing 17, which is preferably a double conical roller bearing arrangement, fixes the adjacent face of the rotor 2 against axial movement in either direction while the bearing 18 permits axial movement of the outer part of the shaft 2A if required by thermal expansion. The bearing 17 is situated as closely as possible to the rotor 2 so that there is practically no axial thermal growth of that part of the tube $2a$ which lies between the bearing 17 and the rotor. Thus the clearance 13 remains sufficiently constant in the conditions of operation. The inner face of the rotor 2 is attached to a tubular shaft 19 which is extended outwards through the rotor structure and connected to the outer rotary element 20 of a roller bearing (again preferably a double-conical roller bearing). The inner rotary member 21 of the roller bearing is unable to move axially relative to the outer element and it is connected to a shaft member 22 (preferably a hollow tubular member) which extends through the tube 19 and is connected to the rotor 3. The bearing arrangement 20, 21 is far enough from the rotor 2 to be in a relatively cool zone, and is axially slidable within the tubular member 2A. The suspension of the rotor 3 is completed at the other end by means of a shaft 23 which is supported by a bearing 23A, for example a double-conical roller bearing. The bearing $23a$ is carried by the end plate 5 and fixes the axial clearance between the rotor 3 and the plate 5. The assembly comprising the end plate 5, the bearing $23a$ and the scavenging ducting attached to the plate 5 forms an axially shiftable unit. Provision is made as indicated at 26 for the scavenging ducting to be capable of limited axial movement in a fixed plate $1a$ which closes the casing 1. To prevent tilting of the plate 5 concentric tubular members 24, 25 are provided, of which the former is attached to the plate 5, and therefore is axially movable therewith, while the latter is attached to plate 1A and is axially fixed. So that the member 25 can support the member 24 while allowing for axial displacement, the member 24 carries splines 26' engaging appropriate keyways in the member 24. These members are in no way essential, and tilting of plate 5 may be prevented by other means.

The functioning of the rotor supporting means to preserve the critical working clearances referred to above is as follows. As explained above the gap 13 is already substantially unaffected, and any axial growth of the rotor 2 due to the effect of the hot gases in the cells, can only take effect at the inner end of the rotor. When such growth occurs however, it will be seen from the drawing that the rotor 3 will by means of the tubular member 19, bearing 20, 21 and shaft member 22, be axially shifted, accompanied by sliding of the bearing 20, 21 within the member 2A. Thus the gap 14 is not affected by axial growth of the rotor 2. So far as the rotor 3 is concerned any axial growth which occurs takes place only in the direction left to right with reference to the drawing. Such growth results in axial shifting of the bearing 23a, end plate 5 and the tubular member 24. Thus the gap 15 is also preserved. It will thus be seen that the sum of the axial growth of the rotors 2, 3 is transmitted to the end plate 5 and the associated axially movable structure. It is important that the members 19, 22 should undergo substantially the same axial growth and for this reason they should be of similar mass and arranged close to each other in order that there may be no differential expansion between them which would adversely affect the clearance 14. To assist in achieving this result the members 19, 22 may be formed in special ways so as to increase the heat transmission from one member to the other. For example, one or both members may be apertured or provided with fins or the like.

What I claim is:

1. A pressure exchanger comprising in combination a first and a second element mounted coaxially for relative rotation and having first adjoining end faces between which a predetermined clearance has to be maintained despite any alterations in axial dimension of the elements, and second adjoining end faces, said first element defining a series of open-ended cells extending therethrough, said second element including inlet means to allow the introduction of low pressure fluid into said cells, a second inlet means circumferentially displaced from said first inlet means to allow the introduction of high pressure fluid into said cells and an outlet, and a bearing arrangement including means for fixing axially the second adjoining end faces, a bearing housing forming part of said means, a bearing element axially displaceable within said housing, a hollow connection passing through said first element and extending from said bearing element to the first adjoining end face of said first element, another bearing element running within said first mentioned bearing element and cooperating therewith to prevent relative axial displacement, a connecting shaft passing through said hollow connection and extending from the first adjoining end face of said second element to said other bearing element, and means supporting the first adjoining end face of said second element for axial movement.

2. A pressure exchanger as claimed in claim 1 in which the linear thermal expansion characteristics of said hollow connection and said connecting shaft are substantially equal.

3. A pressure exchanger, in which gas compression results directly from and proceeds simultaneously with gas expansion, comprising in combination two contra-rotatable rotors mounted on the same axis and having adjoining end faces between which a predetermined clearance has to be maintained despite any alteration in axial dimension of the rotors including cells around the periphery of each of said rotors, stationary structure adjacent said rotors, means providing a path through said stationary structure and cells of both rotors for scavenging gas flow at least once per working cycle of each cell, and means permitting transfer gas flow between cells of both rotors, when scavenging gas flow is not occurring in those cells, which transfer gas flow directly affects gas compression in cells of one rotor by gas expansion from cells of the other rotor, means for fixing axially the end face of one of said rotors remote from the other rotor, a bearing housing forming a part of said means carried by the axially fixed face, a bearing element axially displaceable within said housing, a hollow connection passing through said one rotor and extending from said bearing element to said adjoining end face of said one rotor, another bearing element running within said first-mentioned bearing element and cooperating therewith to prevent relative axial displacement, a connecting shaft passing through said hollow connection and extending from said adjoining end face of said other rotor to said other bearing element, and axially displaceable supporting means for the end face of said other rotor remote from said adjoining faces.

4. A pressure exchanger in which gas compression results directly from and proceeds simultaneously with gas expansion, comprising in combination two contra-rotatable rotors mounted on the same axis and having adjoining end faces between which a predetermined clearance has to be maintained despite any alteration in axial dimension of the rotors including cells around the periphery of each of said rotors, stationary structure including end plates adjacent the remote faces of said rotors, means providing a path through said stationary structure and cells of both rotors for scavenging gas flow at least once per working cycle of each cell, and means permitting transfer gas flow between cells of both rotors, when scavenging gas flow is not occurring in those cells, which transfer gas flow directly affects gas compression in cells of one rotor by gas expansion from cells of the other rotor, and bearing means including means axially fixing one of said end plates, an axially fixed bearing which is common to said axially fixed end plate and the adjacent face of one rotor so determined the clearance therebetween, a bearing housing carried by said adjacent face of said one rotor, an outer bearing element axially displaceable within said housing, a hollow connection passing through said one rotor and extending from said outer bearing element to the face of said one rotor adjoining the other cell ring, an inner bearing element running within said outer bearing element and cooperating therewith to prevent relative axial displacement, a connecting shaft passing through said hollow connection and extending from the adjoining end face of said other rotor to said inner bearing element, means axially displaceably supporting the other end plate adjacent said other rotor, and a bearing common to said displaceable end plate and the end face of said other rotor adjacent said displaceable end plate which bearing determines the clearance therebetween.

References Cited in the file of this patent

UNITED STATES PATENTS

| 2,045,152 | Lebre | June 23, 1936 |
| 2,399,394 | Seippel | Apr. 30, 1946 |
| 2,461,186 | Seippel | Feb. 8, 1949 |